United States Patent [19]

Angeli et al.

[11] Patent Number: 5,177,149
[45] Date of Patent: Jan. 5, 1993

[54] THERMOPLASTIC BLENDS OF AMORPHOUS POLYAMIDES AND POLY(ALKENYL AROMATIC) RESINS

[75] Inventors: Stephen R. Angeli, Evansville, Ind.; Louis M. Maresca, Schenectady, N.Y.

[73] Assignee: General Electric Company, Pittsfield, Mass.

[21] Appl. No.: 708,795

[22] Filed: May 30, 1991

Related U.S. Application Data

[63] Continuation of Ser. No. 275,443, Nov. 23, 1988, abandoned.

[51] Int. Cl.$^5$ .............................................. C08L 77/00
[52] U.S. Cl. ...................................... 525/184; 525/66; 525/181
[58] Field of Search ................................... 525/184, 66

[56] References Cited

U.S. PATENT DOCUMENTS

| | | | |
|---|---|---|---|
| 3,330,899 | 6/1966 | Fukushima et al. | 525/184 |
| 3,334,133 | 8/1967 | Fukushima et al. | 525/184 |
| 3,383,435 | 5/1968 | Cizek | 525/132 |
| 3,496,985 | 3/1964 | Werner | 525/184 |
| 3,884,882 | 5/1975 | Caywood, Jr. | 525/205 |
| 3,944,631 | 3/1976 | Yu et al. | 525/305 |
| 3,966,839 | 6/1976 | Sims | 260/857 |
| 3,974,234 | 8/1976 | Brinkmann et al. | 525/66 |
| 4,147,740 | 4/1979 | Swiger et al. | 525/263 |
| 4,174,358 | 11/1979 | Epstein | 525/183 |
| 4,251,644 | 2/1981 | Joffrion | 525/64 |
| 4,341,882 | 7/1982 | Katchman | 525/68 |
| 4,346,194 | 8/1982 | Roura | 525/66 |
| 4,373,065 | 2/1983 | Prest, Jr. | 525/132 |
| 4,474,927 | 10/1984 | Novak | 525/66 |
| 4,503,168 | 3/1985 | Hartsing, Jr. | 524/413 |
| 4,590,241 | 5/1986 | Hohlfeld | 525/132 |
| 4,740,552 | 4/1988 | Grant et al. | 525/66 |
| 4,826,933 | 5/1989 | Grant et al. | 525/397 |
| 4,959,415 | 9/1990 | Taubitz et al. | 525/133 |
| 4,965,318 | 10/1990 | Taubitz et al. | 525/179 |

FOREIGN PATENT DOCUMENTS

| | | |
|---|---|---|
| 0288269 | 10/1988 | European Pat. Off. |
| 0302510 | 2/1989 | European Pat. Off. |
| 3544761 | 6/1987 | Fed. Rep. of Germany |

Primary Examiner—Ana L. Carrillo

[57] ABSTRACT

Thermoplastic blends of amorphous polyamide resins with poly(alkenyl aromatic) resins have improved properties over previously known blends, including producing clear, transparent blends over their entire compositional range.

17 Claims, No Drawings

THERMOPLASTIC BLENDS OF AMORPHOUS POLYAMIDES AND POLY(ALKENYL AROMATIC) RESINS

This is a continuation of application Ser. No. 07/275,443, filed Nov. 23, 1988 and now abandoned.

The present invention relates to thermoplastic resin compositions comprising amorphous polyamides and poly(alkenyl aromatic) resins.

BACKGROUND OF THE INVENTION

Polyamides, more commonly referred to as nylons, are thermoplastic materials which feature repeating amide groups. They are generally semi-crystalline, have superior load-bearing capability at elevated temperatures, good toughness, low frictional properties, and good chemical resistance. Amorphous polyamide resins are transparent, although they can be tinted or colored opaquely. They are frequently used in applications requiring transparency, toughness, and chemical resistance. In addition, while most nylons are inherently hygroscopic, amorphous nylons have substantially lower water absorption levels at equilibrium.

In recent years, nylons have been blended with various homopolymers and copolymers to yield products which have improved properties for their particular use. For example, alloys of nylon with olefin copolymers yield high-performance injection molding compounds with improved toughness and lowered water absorption. Blends of crystalline nylons with sulfone polymers are disclosed in Hartsing, Jr., U.S. Pat. No. 4,503,168 in order to enhance the solvent resistance of the sulfone polymers. Amorphous polyamides have been improved by the addition of various impact modifiers when additional impact strength is desired. Such impact modifiers are typically natural or synthetic rubber compounds including polymeric and copolymeric compounds such as butadiene rubber, EPDM rubber, di-and tri-block copolymers of styrene and butadiene, as well as other elastomeric products. Many of these are commercially available from a variety of sources.

Poly(alkenyl aromatic) resins such as polystyrene are thermoplastic resins having a wide range of physical properties. They are available in formulations ranging from general purpose crystal polystyrene to impact grades and other highly specialized resins modified for foam molding and extrusion, flame-retardation, etc. The wide range of physical properties obtainable with the poly(alkenyl aromatic) resins makes them a desirable material. In addition, it is known that rubber-modified poly(alkenyl aromatic) resins are useful thermoplastic materials which are relatively low-cost. Such resins have become widely used in spite of some deficiencies in impact strength, thermal resistance and surface appearance, e.g., gloss in thermoformed articles.

In recent years, polystyrenes have been blended with various copolymers to yield thermoplastic compositions which have improved physical properties over that of polystyrene alone. For example, Cizek, U.S. Pat. No. 3,383,435 discloses blends of polyphenylene ethers and styrene resins, which are said to have improved resistance to organic solvents. Cizek further discloses that blends of a polyphenylene ether and a styrene-acrylonitrile (SAN) copolymer have even superior chemical resistance than polyphenylene ether/polystyrene blends. Yu et al., U.S. Pat. No. 3,944,631 discloses styrene-acrylonitrile copolymers which are modified by adding an impact modifier consisting of a cross-linked (meth)acrylate rubbery core and a crosslinked interpenetrating styrene-acrylonitrile resin shell in order to improve impact strength and weather resistance. Other useful thermoplastic compositions are disclosed in Katchman, U.S. Pat. No. 4,341,882 wherein polyphenylene ethers and alkenyl aromatic resins are combined with a styrene-allyl alcohol copolymer as an anti-static agent.

Mention is also made of blends of reactive polystyrenes with thermoplastic resins, specifically, polyphenylene ether resins For example, Hohlfeld, U.S. Pat. No. 4,590,241 reacts styrene with an oxazoline compound then blends the product with polyphenylene ethers and low density polyethylenes to form miscible blends which behave in an intermediate fashion as compared to the individual components.

Many other styrene-based blends are well-known in the art, such as polystyrene with block copolymers of polystyrene and an elastomer such as polyisoprene, polybutadiene, ethylene-propylene, or ethylene-butylene rubber.

However, the uses of polystyrene have been limited due to its susceptibility to degradation from UV radiation, and to chemical attack. While impact modification of polystyrene can provide a tensile and flexural strength which can range from 2000 to 7000 p.s.i., the impact grades are also susceptible to UV radiation, and offer limited chemical resistance.

It has now been discovered that blends of amorphous polyamides with poly(alkenyl aromatic) resins have improved properties over previously known blends, including producing surprisingly clear, optically transparent materials, having near zero birefringence, over their entire compositional range. Because of these improved properties and transparency, blends of amorphous polyamides and poly(alkenyl aromatic) resins are suitable for many commercial uses, such as optical devices. These blends are immiscible, as determined by the presence of two glass transition temperatures.

SUMMARY OF THE INVENTION

In accordance with the present invention, there are provided thermoplastic resin compositions comprising
(a) an amorphous polyamide resin; and
(b) a poly(alkenyl aromatic) resin.

In preferred embodiments of the present invention, the amorphous polyamide is a copolymer of hexamethylenediamine and isophthalic acid, commonly known as nylon-6,I. In other preferred embodiments, the poly(alkenyl aromatic) resins are styrenic-based materials.

Preferably, the thermoplastic resin compositions of the present invention comprise from about 2 to about 98 percent by weight of the amorphous polyamide resin and from about 98 to about 2 percent by weight of the poly(alkenyl aromatic) resin and especially preferred are compositions comprising from about 35 to about 75 percent by weight of nylon-6,I and from about 65 to about 25 percent by weight of polystyrene or reactive polystyrene with varying amounts of oxazoline.

DETAILED DESCRIPTION OF THE INVENTION

Polyamides suitable as component (a) for the preparation of the blends of the present invention may be obtained by polymerizing a monoamino-monocarboxylic acid, or a lactam thereof, having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid, or a lactam thereof, as defined above, together with substantially equimolar proportions of a diamine and a dicarboxylic acid. The dicarboxylic acid may be used in the form of a functional derivative thereof, for example, an ester or acid chloride. The term "substantially equimolar" proportions (of the diamine and of the dicarboxylic acid) is used to cover both strict equimolar proportions and slight departures therefrom which are involved in conventional techniques for stabilizing the viscosity of the resultant polyamides.

Examples of the aforementioned monoamino-monocarboxylic acids, or lactams thereof, which are useful in preparing the polyamides include those compounds containing from 2 to 16 carbon atoms between the amino and carboxylic acid groups, the carbon atoms forming a ring with the —CO—NH group in the case of a lactam. As particular examples of aminocarboxylic acids and lactams there may be mentioned: aminocaproic acid, butyrolactam, pivalolactam, caprolactam, capryllactam, enantholactam, undecanolactam, dodecanolactam and 3- or 4-aminobenzoic acids.

Diamines suitable for use in the preparation of the polyamides include the straight chain and branched, alkyl, aryl and alkyl-aryl diamines. Such diamines include, for example, those represented by the general formula:

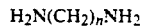

$$H_2N(CH_2)_nNH_2$$

wherein n is an integer of from 2 to 16, such as ethylenediamine, propylenediamine, tetramethylenediamine, pentamethylenediamine, hexamethylenediamine and the like. Also included are diamines such as 2-methylpentamethylenediamine, isomeric trimethylhexamethylenediamine, meta-xylylenediamine, para-xylylenediamine, 1,3-bis(aminomethyl) cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl) propane, 1,4-piperazine, meta-phenylenediamine, paraphenylenediamine, bis(4-aminophenyl)methane, and the like, or a mixture of any of the foregoing.

The dicarboxylic acids maybe aromatic or aliphatic dicarboxylic acids of the formula:

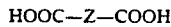

HOOC—Z—COOH wherein Z represents a divalent aliphatic group containing at least 2 carbon atoms or an aromatic group containing at least 6 carbon atoms. Examples of such acids are sebacic acid, suberic acid, azeleic acid, glutaric acid, pimelic acid, adipic acid, terephthalic acid, isophthalic acid and the like.

The polyamides described herein are either commercially available or can be produced by methods well known in the art.

In general, it is true that all polyamides have both a crystalline and an amorphous state. However, as a practical matter, it is difficult to obtain many of the polyamides in the amorphous state. Symmetrical, hydrogen-bonded, linear polyamides are, invariably, highly crystalline with well defined x-ray patterns. Thus, it is difficult to avoid high degrees of crystallinity with polymers, e.g., nylon-6,6, -6,10, and -6, whose regular structures permit good chain alignment and high degrees of hydrogen bonding in the plane of the chains. Chain stiffness also contributes to crystallinity, rendering hydrogen bonding unnecessary for crystallinity where chain stiffness and symmetry are sufficiently high. Ring-containing polyamides, especially aromatic ring-containing polyamides such as polyterephthalamides, have high stiffness and tend to be crystalline.

Thus, it is within the skill of persons knowledgeable in the art to produce amorphous polyamides through any one of a combination of several methods. Faster polyamide melt cooling tends to result in an increasingly amorphous resin. Side chain substitutions on the polymer backbone, such as the use of a methyl group to disrupt regularity and hydrogen bonding, may be employed. Non-symmetric monomers, for instance, odd-chain diamines or diacids and meta aromatic substitution, may prevent crystallization. Symmetry may also be disrupted through copolymerization, that is, using more than one diamine, diacid or monoamino-monocarboxylic acid to disrupt regularity. In the case of copolymerization, monomers which normally may be polymerized to produce crystalline homopolymer polyamides, for instance, nylon-6, 6/6, 11, 6/3, 4/6, 6/4, 6/10, or 6/12, or 6,T may be copolymerized to produce a random amorphous copolymer. Amorphous polyamides for use herein are generally transparent with no distinct melting point, and the heat of fusion is about 1 cal/gram or less. The heat of fusion may be conveniently determined by use of a differential scanning calorimeter (DSC).

An especially preferred polyamide for use in the preparation of blends according to the present invention is poly(hexamethylene isophthalamide), commonly referred to as nylon-6,I. Nylon-6,I is prepared by reacting hexamethylene diamine with isophthalic acid or its reactive ester or acid chloride derivatives.

It is also to be understood that the use of the term "polyamides" herein and in the appended claims is intended to include the toughened or super tough polyamides. Super tough polyamides, or super tough nylons, as they are more commonly known, are available commercially, e.g., from E. I. duPont under the tradename Zytel®ST, or may be prepared in accordance with a number of patents including, among others, Epstein, U.S. Pat. No. 35 4,174,358; Novak, U.S. Pat. No. 4,474,927; Roura, U.S. Pat. No. 4,346 and Joffrion, U.S. Pat. No. 4,251,644. These super tough nylons are prepared by blending one or more polyamides with one or more polymeric or copolymeric elastomeric toughening agents. Suitable toughening agents are disclosed in the above-identified U.S. Patents as well as in Caywood, Jr., U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425-437 (1982). Typically, these elastomeric polymers or copolymers may be straight chain or branched as well as graft polymers or copolymers, including core-shell graft copolymers, are characterized as having incorporated therein either by copolymerization or by grafting on the performed polymer, a monomer having functional and/or active or highly polar groupings capable of interacting with or adhering to the polyamide matrix so as to enhance the toughness of the polyamide polymer.

The poly(alkenyl aromatic) resins useful in the present invention are the well-known styrene-based materials. In general, the poly(alkenyl aromatic) resins can be any homopolymer or co-and ter-polymer or rubber-modified homopolymer or co- and terpolymer containing alkenyl aromatic compounds of the formula

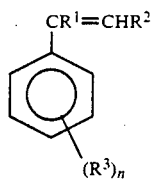

wherein $R^1$ and $R^2$ are selected from the group consisting of lower alkyl or alkenyl groups of from 1 to 6 carbon atoms, and hydrogen; $R^3$ is selected from the group consisting of chloro, bromo, fluoro, hydrogen and lower alkyl of from 1 to 6 carbon atoms, and n is an integer from 0 to 5. $R^3$ can be attached to the aromatic ring in more than one position to form, for example, a naphthalene blends of the present invention include styrene, vinyl toluene, alpha methyl styrene, divinylbenzene, ethyl vinylbenzene, vinylnaphthalene, mono- and polychlorostyrene, mono- and poly-bromostyrene, mixtures of any of the foregoing, and the like. These well-known materials are available from a variety of commercial sources.

Rubber modification of the foregoing alkenyl aromatic resins may be accomplished in a known manner. For instance, the rubber modified styrenes can be provided by combining or grafting natural or synthetic rubber compounds (e.g., a diene rubber, an ethylene-propylene-diene terpolymer rubber (EPDM), a polybutadiene, or an acrylate rubber) with styrene polymers. Examples of such grafted resins include rubber modified high impact polystyrene (HIPS), styrene-acrylonitrile (SAN) rubber, styrene-butadiene (SBR) rubber, linear, graft and radial teleblock copolymers of styrene and butadiene (or of styrene and isoprene), styrene-acrylonitrile-butadiene (ABS) terpolymers, and so forth.

Alkenyl aromatic resins, useful in the present invention, may also be reacted with iminoether functional groups, preferably cyclic iminoethers. Such compounds are described in Hohlfeld, U.S. Pat. No. 4,590,241, and are commonly called reactive alkenyl aromatics. Preferred is styrene reacted with an oxazoline compound such as a 2-alkyl or 2-alkenyl-2-oxazoline. Especially preferred is styrene reacted with from about 0.01 to about 10 percent by weight of a 2-alkenyl-2-oxazoline compound such as 2-isopropenyl-2-oxazoline. Hohlfeld, while disclosing reactive polystyrenes, teaches mixing the reactive polystyrenes with polyphenylene ethers and linear low density polyethylenes to form compatible blends; but does not disclose blends of reactive polystyrene.

The compositions of the present invention will generally be comprised of approximately 2 to 98 percent by weight of the amorphous polyamide resin and from about 98 to about 2 percent by weight of the poly(alkenyl aromatic) resin. It is particularly preferred that the compositions about 35 to about 75 parts by weight of the polyamide and from about 65 to about 25 parts by weight of the poly(alkenyl aromatic) resin. In one embodiment, the compositions of this invention contain 55 percent by weight of the polyamide and about 45 percent by weight of the poly(alkenyl aromatic) resin.

The foregoing components can be compounded and molded by conventional means. The order of mixing and degree of shear experienced during extrusion can be varied. It would be expected that the physical properties could vary as such processing conditions are varied. Those skilled in the art will be able to achieve optimum processing conditions which may vary for different thermoplastic applications.

Thus in one instance, each of the ingredients could be blended and extruded at once, thereby providing a thermoplastic resin having a particular property profile. Alternatively, it may be desirable to pre-blend or pre-compound some of the ingredients while the remaining ingredients are charged later in a compounding or extrusion process.

Additionally, it is expected that conventional additives such as fillers, pigments, stabilizers, plasticizers and flame retarding compounds can be incorporated in the thermoplastic compositions of the present invention, thereby providing a variety of useful products. For fillers, both reinforcing and non-reinforcing fillers are contemplated, including glass, clay and other mineral fillers. Conventional heat and oxidative stabilizers may also be used. Among the useful flame retarding compounds which may be utilized are organic and inorganic halogen and phosphorus compounds with or without synergists such as, for example, antimony trioxide.

Preferred embodiments of this invention comprise blends of nylon-6,I blended with crystal polystyrene (XPS) or reactive polystyrene. Nylon-6,I blends with polystyrene or reactive polystyrene containing 1 percent oxazoline by weight are amorphous polymers. It is known that crystalline amorphous nylons blended with polystyrenes are almost always found to be opaque to translucent in nature. Surprisingly, the blends of this invention are found to be optically transparent in all proportions despite the immiscibility of the blends, as evidenced by its two glass transition temperatures.

Materials which are optically transparent and optically isotropic possess optical properties which are the same in all directions, such as the index of refraction and light absorption.

Birefringence is a measure of the difference of a material's indices of refraction when polarized light is passed through a material in two directions, one perpendicular to the other. Birefringence of an optically isotropic material is zero, thus the lower the birefringence the more optically isotropic the material is. In other words, birefringence is a measure of a materials anisotropic nature.

Another measure of optical isotropy is light absorption. As polar light passes through an isotropic material, the amount of light absorbed is the same no matter the direction of the light. The difference of light absorption a material exhibits when polarized light is passed through the material in two directions, one perpendicular to the other, is another measure of a material's anisotropic nature.

In many optical devices, such as optical discs used in the recording and retrieving of information thereon, it is essential that the material used to form the disc and the various layers therein be substantially optically isotropic with negligible birefringence values.

Although many materials possess zero birefringence values in their bulk state, the processing of the material, such as injection molding, places great stress on the molecular structure of the resin, in order to force the material to flow and conform to the shape of the mold. Such stresses are directional in nature and result in a distortion of the crystalline structure in the direction of the applied stress. This causes induced birefringence in the polymer material, thereby making the polymer material unsuitable for optical devices.

One possible solution to this optical anisotropic problem is to hold the material in the mold until such time as the internal stresses relax. However, this results in extremely long cycle times and is economically unfeasible.

The present invention provides an immiscible polymer blend which retains its optically isotropic nature even after the mechanical stress of processing is applied to the various blend compositions. The two immiscible polymers, polyamide and polystyrene, have opposite optical anisotropies so that zero or close to zero birefringence is observed at particular blend compositions. In a preferred embodiment of the present invention, optically isotropic devices and components are made of a blend of a polyamide and a polystyrene, said blend containing from about 35 to about 75 percent by weight of the polyamide and from about 65 to about 25 percent by weight of the polystyrene.

It has been theorized, although applicant does not wish to be bound by any theory, that the polyamide and polystyrene form an interacting domain network in a manner that the orientation of one molecular domain is proportional to the orientation of the other molecular domain, at various levels of stress applied to the blend. It is believed that this property of the blend will make it optically isotropic.

A similar phenomena was previously disclosed in Prest, Jr., U.S. Pat. No. 4,373,065 where a blend of two completely miscible polymers, polyphenylene ether and polystyrene over a narrow range of weight proportions, was observed to be optically isotropic.

DESCRIPTION OF THE PREFERRED EMBODIMENTS

The following examples illustrate the invention. They are not to be construed to limit the claims in any manner whatsoever. Unless otherwise specified herein, all proportions are provided on a weight basis.

EXAMPLES 1-3

(a) Preparation of Nylon-6,I

Nylon-6,I is prepared in the following manner. However, this method of preparation is not intended to limit possible conditions for preparation of Nylon-6,I exclusively to this particular example. 3.0 g-moles of 99% pure diphenyl isophthalate, 2.992 g-moles of 98% pure hexamethylene diamine and 0.038 g-moles of 98% pure dodecylamine are charged into a 4CV Atlantic Research helicone reactor at room temperature and atmospheric pressure under a nitrogen blanket. The reactor is sealed and pressurized to 2 lbs/in$^2$ with nitrogen. The mixture is stirred and heated to a temperature of 180° C. over a 45 minute period, then maintained at 180° C. with continuous stirring for an additional 30 minutes. The mixture temperature is then raised to 200° C. over a period of 15 minutes and maintained at 200° C. for an additional 30 minutes. The pressure is then reduced to atmospheric with a nitrogen sweep, whereat the mixture temperature is raised to 225° C. over a 15 minute period. Vacuum is then applied, reducing the reactor pressure in 5 inch mercury increments at 5 minute intervals until a final pressure of 20 inches of mercury is reached. The mixture is stirred under vacuum for an additional 15 minutes, during which time the mixture temperature is increased to 240°-245° C. Additional vacuum is then applied to reduce the reactor pressure to full vacuum, 0.4 to 3 mm of mercury, and the mixture temperature is raised to 265° C. The mixture is continually stirred at the foregoing conditions from 5 to 30 minutes depending upon the raw materials and their relative proportions. At this time, the mixture has been converted into a viscous, high polymeric resin. The reactor is returned to atmospheric pressure by the addition of nitrogen gas, the bottom valve of the reactor is opened and the resin mixture is extruded into a water bath.

The mixture produced is poly(hexamethyleneisophthalamide) resin, or Nylon-6,I, with a free amine end group concentration of 4 g-meq/kg and an intrinsic viscosity of 0.99 dl/g in a 60/40 phenol/symmetrical tetrachloroethane solution at 30° C.

(b) Blending

Varying amounts of Nylon-6,I produced in step (a) are blended with varying amounts of crystal polystyrene or alternatively with varying amounts of reactive polystyrene containing 1 percent by weight oxazoline. The respective blends are premixed by dry blending in a paint mixer. Blending is completed by melt processing the dry blends in Haake Rheocard Torque Rheometer bench top model EU with an attached Rheomex single screw extruder and multi-strand die. The barrel zone temperature profile is set as follows: Zone 1 at 245° C., Zone 2 at 260° C., Zone 3 at 260° C. and the die at 260° C. Screw speed is 100 RPM with atmospheric venting.

(c) Injection Molding

The various blends of step (b) are dried in a circulating, forced hot air oven at 90° C. before feeding into a 75 Ton Newburg screw injection molding machine. The processing parameters are identical for each blend and are as follows: rear barrel zone temperature at 510° F., middle barrel zone temperature at 510° F., nozzle zone temperature at 510° F., mold temperature at 150° F., injection pressure at 1500 psi and a total cycle time of 10 seconds. The blends are injection molded at the above parameters into a test specimen. Property profiles are determined for each blend and set forth in Table 1 below along with blend compositions, glass transition temperatures and intrinsic birefringence values. Glass transition temperatures are determined by differential scanning calorimetry data obtained by testing. Intrinsic birefringence is measured using a sonic modulus apparatus in conjunction with a compensator. The sonic modulus apparatus determines the orientation and the compensator measures birefringence. Intrinsic birefringence is then easily calculated with these values.

TABLE 1

| NYLON 6,I AND POLYSTYRENE BLEND PROPERTIES | | | | | | | | | |
|---|---|---|---|---|---|---|---|---|---|
| | Example | | | | | | | | |
| | 1A* | 1B* | 1C* | 4 | 5 | 6 | 7 | 8 | 9 |
| Material | | | | | | | | | |
| Nylon-6,I wt % | 100 | 0 | 0 | 90 | 50 | 10 | 90 | 50 | 10 |
| RPS. wt % | 0 | 100 | 0 | 10 | 50 | 90 | 0 | 0 | 0 |

TABLE 1-continued

NYLON 6,I AND POLYSTYRENE BLEND PROPERTIES

| | \multicolumn{9}{c}{Example} | | | | | | | | |
|---|---|---|---|---|---|---|---|---|---|
| | 1A* | 1B* | 1C* | 4 | 5 | 6 | 7 | 8 | 9 |
| Oxazoline, wt % RPS | 0 | 1 | 0 | 1 | 1 | 1 | 0 | 0 | 0 |
| XPS, wt % | 0 | 0 | 100 | 0 | 0 | 0 | 10 | 50 | 90 |
| Properties | | | | | | | | | |
| HDT, °F. | — | — | — | 222 | 206 | 185 | 220 | 199 | 191 |
| Notched Izod, ft-lb/in | — | — | — | 1.08 | 0.69 | 0.40 | 1.41 | 0.84 | 0.35 |
| Stress Yield, KPSI | — | — | — | 14.5 | 7.0 | 5.9 | 14.1 | 7.3 | 6.7 |
| Stress Break, KPSI | — | — | — | 14.5 | 7.6 | 5.9 | 14.1 | 7.7 | 6.7 |
| Modulus, KPSI | — | — | — | 410 | 498 | 484 | 430 | 495 | 504 |
| Elongation Yield, % | — | — | — | 6.0 | 2.1 | 1.6 | 5.6 | 2.4 | 1.8 |
| Elongation Break, % | — | — | — | 6.0 | 2.9 | 1.6 | 5.6 | 3.4 | 1.8 |
| Glass Transition Temp., °C. | 123 | 107 | 103 | 107,123 | 107,123 | 107,123 | 103,123 | 103,123 | 103,123 |
| Intrinsic Birefringence | 0.078 | −0.100 | −0.100 | −0.090 | −0.005 | 0.063 | −0.090 | −0.005 | 0.063 |

RPS = reactive polystyrene
XPS = crystal polystyrene
HDT = heat distortion temperature
* = control sample Surprisingly all of the blends, Examples 4–9, are optically transparent. Further testing has determined that blends of 55 weight percent nylon-6,I and 45 weight percent of crystal or reactive polystyrene exhibit approximately zero birefringence and blends comprising from about 35 to about 75 weight percent nylon-6,I and from about 65 to about 25 weight percent of crystal or reactive polystyrene have negligible values of intrinsic birefringence, even after molding, and are suitable blends for use in optical devices. It is also clear from the Table above that the blends are immiscible as evidenced by each blends two glass transition temperatures.

All of the foregoing patents and publications are hereby incorporated by reference.

The foregoing examples were given by way of illustration only and not intended as a limitation on the scope of this invention. Many variations are possible without departing from its spirit and scope. For example, instead of reactive polystyrene containing 1 percent oxazoline, reactive polystyrene can contain up to as much as 10 percent oxazoline groups. Instead of nylon-6,I, it is contemplated that other amorphous polyamide resins can be used, such as copolymers of at least two of the following, nylon-6, nylon-6/6, nylon-11, nylon-12, nylon6/3, nylon-4/6, nylon-6/4, nylon-6/10, nylon-6/12 and the like. These amorphous polyamide resins may be prepared under many conditions which are known to those skilled in this art. Polystyrenes useful in this invention may comprise polystyrene, poly(alphamethylstyrene), poly(paramethylstyrene), rubber modified polystyrene and the like.

All such obvious modifications are within the full intended scope of the appended claims.

We claim:

1. A thermoplastic resin device consisting of:
   (a) an amorphous polyamide resin polymerized from monomers comprising nonsymmetric monomers; and
   (b) a poly(alkenyl aromatic) resin consisting of units of the formula:

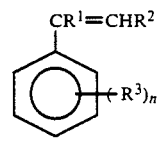

wherein $R^1$ and $R^2$ are selected from the group consisting of lower alkyl or alkenyl groups of from 1 to 6 carbon atoms, and hydrogen; $R^3$ is selected from the group consisting of chloro, bromo, fluoro, hydrogen, and lower alkyl of from 1 to 6 carbon atoms and is attached to the aromatic ring in at least one position; and n is an integer from 0 to 5.

2. A composition as defined in claim 1 wherein component (a) is optically transparent.

3. A composition as defined in claim 1 wherein component (a) has no distinct melting point.

4. A composition as defined in claim 1 wherein component (a) has a heat of fusion of about 1 cal/gram or less.

5. A composition as defined in claim 1 wherein component (a) has side chain substitutions.

6. A thermoplastic resin composition as defined in claim 1 wherein said non-symmetric monomers of component (a) are selected from the group consisting of odd-chain diamines and diacids, and meta aromatic diamines and meta aromatic diacids.

7. A composition as defined in claim 1 wherein component (b) consists of units in which
   (i) $R^1$, $R^2$ and $R^3$ are hydrogen; commonly known as styrene; or
   (ii) $R^1$ is methyl and $R^2$ and $R^3$ are hydrogen; commonly known as alpha-methylstyrene; or
   (iii) $R^1$ and $R^2$ are hydrogen and $R^3$ is methyl; commonly known as para-methylstyrene.

8. A composition as defined in claim 1 which consists of from about 2 to about 98 percent by weight of component (a) and from about 98 to about 2 percent by weight of component (b).

9. A composition as defined in claim 1 wherein said amorphous polyamide is a copolymer of at least two nylons selected from the group consisting of nylon-6, 6/6, 11, 6/3, 6/10, 6/12, and 6/T.

10. An optical device comprising a resin blend consisting of (a) an amorphous polyamide resin polymerized from monomers comprising non-symmetric monomers; and (b) a poly(alkenyl aromatic) resin which consists of units of the formula

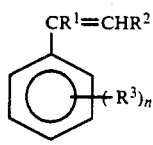

wherein $R^1$ and $R^2$ are selected from the group consisting of lower alkyl or alkenyl groups of from 1 to 6 carbon atoms, and hydrogen; $R^3$ is selected from the group consisting of chloro, bromo, fluoro, hydrogen, and lower alkyl groups of from 1 to 6 carbon atoms and is attached to the aromatic ring in at least one position; and n is an integer of from 0 to 5; said optical device being optically transparent exhibiting negligible birefringence values.

11. A composition as defined in claim 10 wherein component (a) consists of nylon-6I, and component (b) consists of polystyrene.

12. A composition as defined in claim 10 which consists of about 55 percent by weight of component (a) and about 45 percent by weight of component (b).

13. A composition as defined in claim 10 which consists of from about 35 to about 75 percent by weight of nylon-6I and from about 65 to about 25 percent by weight of polystyrene.

14. A composition as defined in claim 10 which consists of nylon-6I and component (b) consists of crystal polystyrene.

15. A composition as defined in claim 14 which consists of about 35 to about 75 percent by weight of component (a) and from about 65 to about 25 percent by weight of component (b).

16. A composition as defined in claim 14 which consists of about 45 percent by weight of component (a) and about 55 percent by weight of component (b).

17. A thermoplastic resin composition consisting of:
(a) an amorphous polyamide comprising the reaction product of hexamethylene diamine and isophthalic acid; and
(b) a poly(alkenyl aromatic) resin consisting of units of the formula:

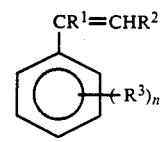

wherein $R^1$ and $R^2$ are selected from the group consisting of lower alkyl or alkenyl groups of from 1 to 6 carbon atoms, and hydrogen; $R^3$ is selected from the group consisting of chloro, bromo, fluoro, hydrogen, and lower alkyl groups of from 1 to 6 carbon atoms and is attached to the aromatic ring in at least one position; and n is an integer from 0 to 5.

* * * * *